(12) United States Patent
Lim et al.

(10) Patent No.: US 11,775,040 B2
(45) Date of Patent: Oct. 3, 2023

(54) ELECTRONIC DEVICE AND METHOD FOR RECEIVING POWER FROM EXTERNAL ELECTRONIC DEVICE

(71) Applicant: Samsung Electronics Co., Ltd., Gyeonggi-do (KR)

(72) Inventors: Kyungwoo Lim, Gyeonggi-do (KR); Chijeong Choi, Gyeonggi-do (KR); Hayeon Kim, Gyeonggi-do (KR); Sangkyung Park, Gyeonggi-do (KR); Sunghwa Park, Gyeonggi-do (KR); Moonki Yeo, Gyeonggi-do (KR); Daekyu Lee, Gyeonggi-do (KR); Seunga Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 252 days.

(21) Appl. No.: 17/287,870

(22) PCT Filed: Nov. 1, 2019

(86) PCT No.: PCT/KR2019/014668
§ 371 (c)(1),
(2) Date: Apr. 22, 2021

(87) PCT Pub. No.: WO2020/091490
PCT Pub. Date: May 7, 2020

(65) Prior Publication Data
US 2021/0399561 A1    Dec. 23, 2021

(30) Foreign Application Priority Data

Nov. 1, 2018 (KR) .................. 10-2018-0133079

(51) Int. Cl.
*H01M 10/44* (2006.01)
*H01M 10/46* (2006.01)
(Continued)

(52) U.S. Cl.
CPC .............. *G06F 1/263* (2013.01); *G06F 1/266* (2013.01); *H02J 7/00034* (2020.01);
(Continued)

(58) Field of Classification Search
CPC .... H02J 7/00034; H02J 7/0044; H02J 7/0047; H02J 7/0042; H02J 2207/40; G06F 1/266;
(Continued)

(56) References Cited

U.S. PATENT DOCUMENTS 4,532,443 A       7/1985 Glennon
10,651,668 B2 *   5/2020 Choi ....................... G06F 1/266
(Continued)

FOREIGN PATENT DOCUMENTS

JP         2007293578    11/2007
KR      1020120011363    2/2012
(Continued)

OTHER PUBLICATIONS

PCT/ISA/210 Search Report issued on PCT/KR2019/014668, dated Feb. 28, 2020, pp. 5.
(Continued)

*Primary Examiner* — Edward Tso
(74) *Attorney, Agent, or Firm* — The Farrell Law Firm, P.C.

(57) ABSTRACT

Disclosed is an electronic device comprising: a first input/output terminal; a second input/output terminal; a power source module; a first switch selectively connecting the first input/output terminal to the power source module; a second switch selectively connecting the second input/output terminal to the power source module; a diode having an anode electrically connected to the first input/output terminal and a cathode electrically connected to the power source module, so that the diode is connected in parallel to the first switch; and a control circuit for controlling the first switch and the
(Continued)

second switch. The electronic device can prevent damage due to power from external electronic devices by controlling the first switch and the second switch in response to connection of the external electronic devices. Additional various embodiments identified through the specification are possible.

15 Claims, 13 Drawing Sheets

(51) Int. Cl.
*G06F 1/26* (2006.01)
*H02J 7/00* (2006.01)
*H02M 3/00* (2006.01)

(52) U.S. Cl.
CPC .......... *H02J 7/0044* (2013.01); *H02J 7/0047* (2013.01); *H02M 3/00* (2013.01); *H02J 2207/40* (2020.01)

(58) Field of Classification Search
CPC .. G06F 1/26; G06F 1/30; G06F 1/263; H02M 3/00
USPC ................... 320/107, 114, 115, 138, 132
See application file for complete search history.

(56) References Cited

U.S. PATENT DOCUMENTS

| | | | |
|---|---|---|---|
| 10,840,730 B2 | 11/2020 | Lim et al. | |
| 2016/0254681 A1* | 9/2016 | Choi | G06F 1/163 320/162 |
| 2018/0177000 A1 | 6/2018 | Son et al. | |

FOREIGN PATENT DOCUMENTS

| | | |
|---|---|---|
| KR | 1020160105999 | 9/2016 |
| KR | 1020170022163 | 3/2017 |
| KR | 1020180069532 | 6/2018 |
| KR | 1020190049256 | 5/2019 |

OTHER PUBLICATIONS

PCT/ISA/237 Written Opinion issued on PCT/KR2019/014668, dated Feb. 28, 2020, pp. 5.

* cited by examiner

ELECTRONIC DEVICE AND METHOD FOR RECEIVING POWER FROM EXTERNAL ELECTRONIC DEVICE

PRIORITY

This application is a National Phase Entry of PCT International Application No. PCT/KR2019/014668, which was filed on Nov. 1, 2019, and claims priority to Korean Patent Application No. 10-2018-0133079, which was filed on Nov. 1, 2018, the entire content of each of which is incorporated herein by reference.

TECHNICAL FIELD

Embodiments disclosed herein relate to an electronic device and a method for receiving power from an external electronic device.

BACKGROUND ART

With the development of an information technology, various types of electronic devices, such as a smartphone, and a tablet personal computer (PC), have been extensively spread. Recently, peripheral devices, which perform various functions using the electronic device, have been introduced.

The peripheral devices may include, for example, a visual reality (VR) headset device electrically connected with a smartphone to allow a user to undergo a VR experience, or a connection device to output a screen which is output from the smartphone, to another display device including a TV. According to various embodiments, the peripheral devices may perform various functions when connected with a main device, such as a smartphone, instead of being individually used.

According to an embodiment, because the peripheral devices are used in connection with the main device, the peripheral devices may operate by receiving power from the main device.

DISCLOSURE

Technical Problem

When the peripheral devices are electrically connected with the main device, a power supply, such as a battery, of the main device may supply power to both the main device and the peripheral devices. However, because the battery is limited in capacity, external power may b required through a power adaptor to allow the user to use the peripheral.

When an external power supply is connected with the peripheral device while the peripheral device is being received power from the battery of the main device, the power may be supplied to the peripheral device by switching to the external power supply from the main device, to save the battery of the main device. In this case, the peripheral device may not operate normally when the power is not supplied to a circuit of the peripheral device during the switching of the power supply.

In addition, when external power is unnecessarily transmitted to the main device through the peripheral device, or when the power of the main device is transmitted to the external power supply through the peripheral device during the switching of the power supply, a connector or the electronic devices may be damaged.

Embodiments disclosed in the disclosure are to provide an electronic device to solve the above problems and to resolve the issues raised herein.

Technical Solution

According to an embodiment of the disclosure, an electronic device may include a first input/output terminal, a second input/output terminal, a power supply module, a first switch to selectively connect the first input/output terminal with the power supply module, a second switch to selectively connect, the second input/output terminal with the power supply module, a diode connected including an anode electrically connected with the first input/output terminal and a cathode electrically connected with the power supply module to be connected with the first switch in parallel, and a control circuit to control the first switch and the second switch. The control circuit may sense connection with a first external electronic device through the first input/output terminal, turn on the first switch in response to the sensed connection with the first external electronic device, such that first power is supplied from the first external electronic device to the power supply module, sense connection with a second external electronic device through the second input/output terminal, and turn off the first switch in a state that the first power is supplied from the first external electronic device to the power supply module through the diode, in response to the sensed connection with the second external electronic device, and turn on the second switch such that second power is supplied to the power supply module from the second external electronic device, in response to the sensed connection with the second external electronic device.

According to an embodiment of the disclosure, a method for supplying power to an electronic device, may include sensing connection with a first external electronic device through a first input/output terminal, turning on a first switch, which is connected between the first input/output terminal and a power supply module, in response to the sensed connection with the first external electronic device, such that first power is supplied from the first external electronic device to the power supply module of the electronic device, sensing connection with second external electronic device through a second input/output terminal different from the first input/output terminal, and turning off the first switch in a state that the first power is supplied from the first external electronic device to the power supply module through a diode, which is connected with the first switch in parallel between the first input/output terminal and the power supply module, and turning on a second switch, which is connected between the second input/output terminal and the power supply module, such that second power is supplied to the power supply module from the second external electronic device, in response to the sensed connection with the second external electronic device.

According to an embodiment of the disclosure, an electronic device may include a first input/output terminal, a second input/output terminal, a power supply module, a first switch to selectively connect the first input/output terminal with the power supply module, a second switch to selectively connect the second input/output terminal with the power supply module, at least one diode having a cathode electrically connected with the power supply module and connected with any one of the first switch or the second switch in parallel, and a control circuit to control the first switch and the second switch. The control circuit may sense connection with a first external electronic device through the first input/output terminal, turn on the first switch such that power is supplied to the power supply module from the first external electronic device, in response to the sensed connection with the first external electronic device, sense the connection of a second external electronic device through the second input/output terminal, and turn off the first switch in the state that power is supplied from the first external electronic device to the power supply module through the at least one diode and turn on the second switch to supply the power to the power supply module from the second external electronic device, in response to the sensed connection with the second external electronic device.

Advantageous Effects

According to embodiments disclosed herein, while power is kept being supplied to a system of the peripheral device, a power source to supply the power may be switched from the main device to the external power supply. Accordingly, the peripheral device may be prevented from being abnormally operated during the switching of the power source to supply power. In addition, the peripheral device, the main device, and the external power supply may be prevented from being damaged, and terminals to connect the devices with each other may be prevented from being damaged. Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Figure 1A:
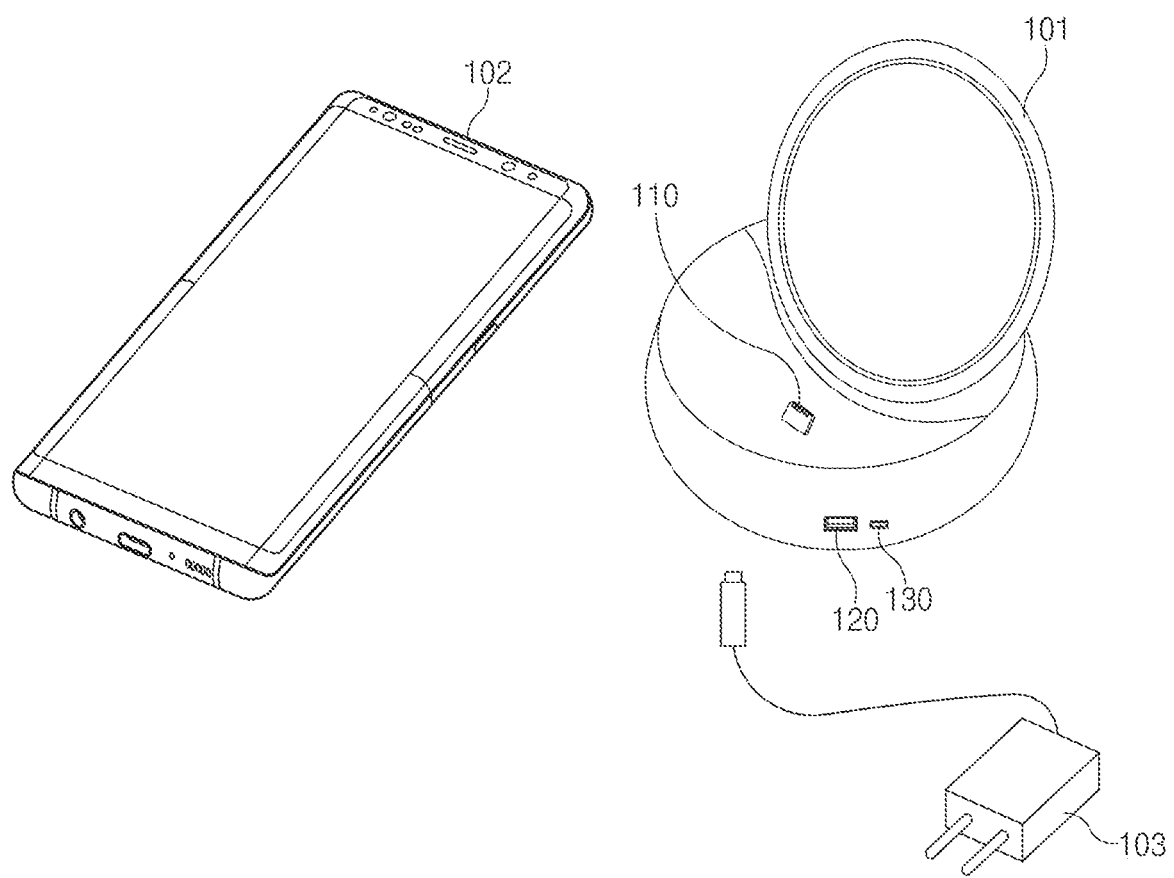
FIG. 1A illustrates an electronic device and an external device which is able to be connected with the electronic device, according to an embodiment.

FIG. 1A illustrates an electronic device and an external electronic device which is able to be connected with the electronic device, according to an embodiment.

Referring to FIG. 1A, an electronic device 101 (e.g., a peripheral device) may be electrically connected with external devices. For example, the electronic device 101 may be electrically connected with an external electronic device 102 (e.g., a main device), such as a terminal, to perform various functions. For another example, the electronic device 101 may be electrically connected with an external power supply 103 (e.g., a power adaptor) for power supply.

Figure 1B:
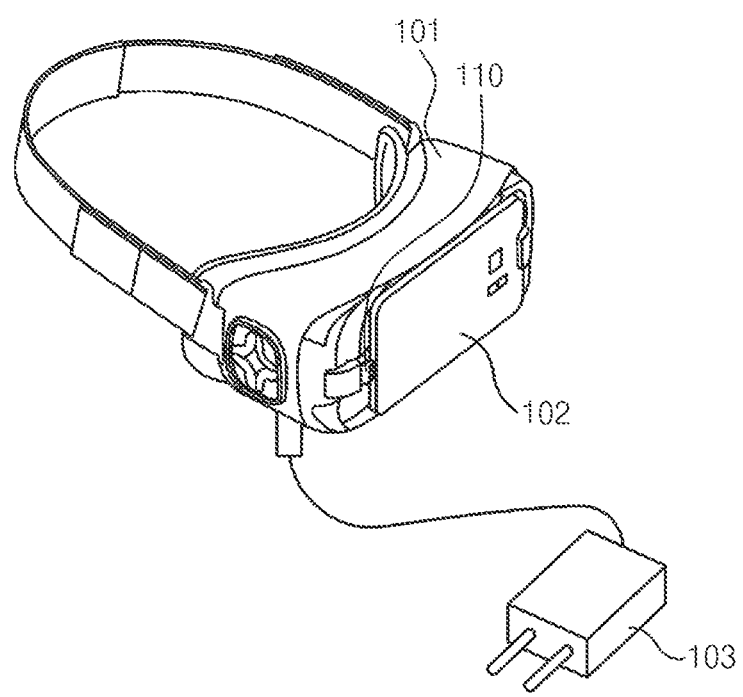
FIG. 1B illustrates an electronic device and an external device which is able to be connected with the electronic device, according to an embodiment.

According to an embodiment, the electronic device 101 may correspond to a peripheral device coupled to the external electronic device 102 to perform a specified function. For example, the electronic device 101 may be a connection device to output a video signal and/or a voice signal, which is output from the external electronic device 102, through a component (for example, a display and/or a speaker) of the electronic device 101. Although FIG. 1B illustrates that the electronic device 101 is an electronic device having the form of a dock which is able to be connected with the external electronic device 102, the form of the electronic device 101 in the disclosure is not limited thereto. For example, the electronic device 101 may be a head mounted display or a head mount display (HMD) allowing a user to experience a virtual reality using the external electronic device 102, The electronic device 101 may be mounted on a head of the user. When the electronic device 101 is mounted on the head of the user, virtual reality or augmented reality may be provided to a user through a display positioned in front of eyes of the user. The electronic device 101 may output the video signal, which is received from the external electronic device 102, through the display of the electronic device 101.

According to an embodiment, the electronic device 101 may include a first input/output terminal 110, a second input/output terminal 120, and a third input/output terminal 130. According to various embodiments, the configuration of the electronic device 101 is not limited to that illustrated in FIG. 1A. For example, the electronic device 101 may further include an additional connection terminal, which is not illustrated in FIG. 1A. At least some of connectors illustrated in FIG. 1A may be omitted. According to various embodiments, each of the first input/output terminal 110, the second input/output terminal 120, and the third input/output terminal 130 may include one of a type A, type B, mini-B, micro-A, micro-B, USB 3.0 type A, USB 3.0 type B, USB 3.0 micro B, or USB 3.1 type C terminal.

According to an embodiment, the first input/output terminal 110 may be a terminal to be electrically connected with the external electronic device 102. For example, the electronic device 101 may be coupled to the external electronic device 102 through the first input/output terminal 110 and may form a specified interface with the external electronic device 102. The external electronic device 102 and the electronic device 101 may transmit or receive the specified signal through the specified interface. For example, the electronic device 101 may be coupled to the external electronic device 102 through the first input/output terminal 110 and may receive power from the battery included in the external electronic device 102.

According to an embodiment, the second input/output terminal 120 may be a terminal for electrical connection with the external power supply 103. According to an embodiment, the electronic device 101 may form a specified interface with the external power supply 103 through the second input/output terminal 120. The electronic device 101 may receive power from the external power supply 103 using the formed interface. According to various embodiments, the external power supply 103 may include a power adaptor or a battery.

According to an embodiment, the third input/output terminal 130 may be a terminal for the electrical connection with another external device which is not illustrated in FIG. 1. According to various embodiments, the another external device may include various output devices, such as a speaker, a monitor, or a TV. According to an embodiment, the electronic device 101 may, form a specified interface with the external electronic device 102 through the first input/output terminal 110, and may form an additional specified interface with another electronic device through the third input/output terminal 130. The electronic device 101 may receive specified data, such as video data or voice data, from the external electronic device 102 using the interface formed through the first input/output terminal 110, and may transmit the received data to the another external electronic device using the interface formed through the third input/output terminal 130. The another external device may output a specified video or voice based on the received data.

According to an embodiment, the external electronic device 102 may include a battery and a power supply module. According to an embodiment, the external electronic device 102 may convert (DC-DC convert) power, which is output from the battery, by using the power supply module, and may supply the converted power to the electronic device 101. According to another embodiment, the external electronic device 102 may supply the power, which is output from the battery, to the electronic device 101 without additionally converting the power.

According to an embodiment, the external electronic device 102 may operate in a power charging mode or a power discharging mode, depending on operating modes of the power supply module. The power charging mode may be understood as being an operating mode of charging the battery with power from the outside, without transmitting the battery power of the external electronic device 102 to the outside, that is, the electronic device 101. The power discharging mode may be understood as being an operating mode of transmitting the batter power of the external electronic device 102 to the outside, that is, the electronic device 101.

FIG. 1B illustrates an electronic device and an external electronic device which is able to be connected with the electronic device, according to an embodiment.

Referring to FIG. 1B, the electronic device 101 (e.g., a peripheral device) may be electrically connected with external devices. For example, the electronic device 101 may be electrically connected with the external electronic device 102 (e.g., the main device), such as a terminal, to perform various functions. For another example, the electronic device 101 may be electrically connected with the external power supply 103 (e.g., a power adaptor) to be supplied with power. Hereinafter, the description made with reference to FIG. 1A will be applied to the description to be made with reference to FIG. 1B, unless specified otherwise. The duplication of description will be omitted for the convenience of explanation.

According to an embodiment, the electronic device 101 may be a peripheral device coupled to the external electronic device 102 to perform a specified function. For example, the electronic device 101 may be a device physically and electrically coupled to the external electronic device 102, For example, the electronic device 101 may be a head mount device allowing a user to experience virtual reality using the external electronic device 102, The electronic device 101 may be mounted on the head of the user. When the electronic device 101 is mounted on the head of the user, the electronic device 101 may provide virtual reality or augmented reality to the user through a display of the external electronic device 102 positioned in front of the eyes of the user.

According to an embodiment, the electronic device 101 may include the first input/output terminal 110 and a second input/output terminal (not illustrated). According to various embodiments, the configuration of the electronic device 101 is not limited to that illustrated in FIG. 1B. For example, the electronic device 101 may further include an additional connector, which is not illustrated in FIG. 1B. At least some of connectors illustrated in FIG. 1B may be omitted. According to various embodiments, each of the first input/output terminal 110, and the second input/output terminal 120 may include one of a type A, type B, mini-A, mini-B, micro-A, micro-B, USB 3.0 type A, USB 3.0 type B USB 3.0 micro B, or USB 3.1 type C terminal.

In the disclosure, power input from the external electronic device 102 to the electronic device 101 may be referred to as "first power", and power input from the external power supply 103 to the electronic device 101 may be referred to as "second power".

Figure 2A:
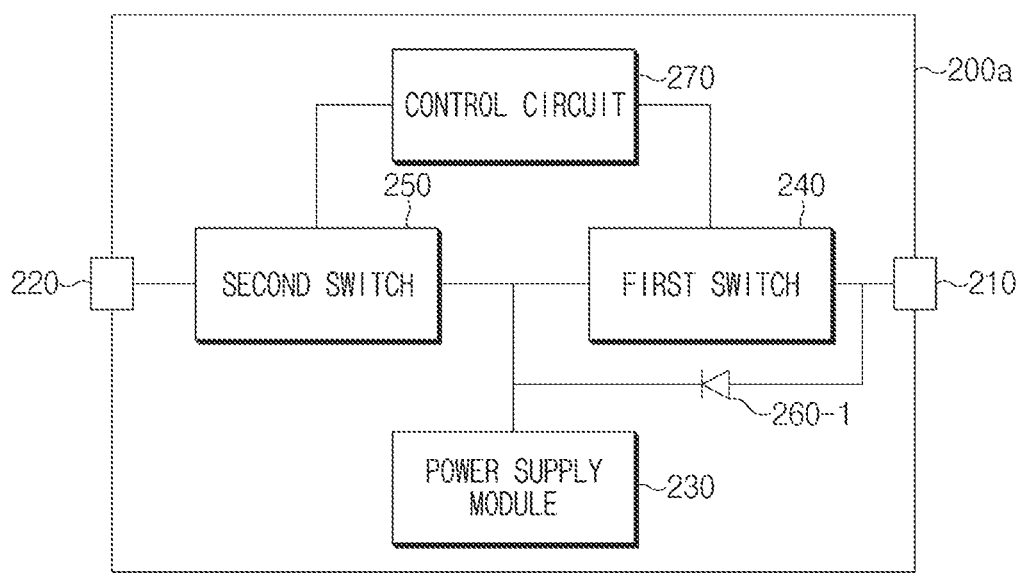
FIG. 2A illustrates a block diagram of an electronic device, according to an embodiment.

FIG. 2A illustrates a block diagram of an electronic device, according to an embodiment;

Referring to FIG. 2A, an electronic device 200a (e.g., the electronic device 101 in FIG. 1A or 1B) may include a first input/output terminal 210 (e.g., the first input/output terminal 110 in FIG. 1A or 1B), a second input/output terminal 220 (e.g., second input/output terminal 120 in FIG. 1A or 1B), a power supply module 230, a first switch 240, a second switch 250, a first diode 260-1 and a control circuit 270. According to various embodiments, the electronic device 200A is not limited to that illustrated in FIG. 2A. For example, the electronic device 200a may further include a communication module or an output nodule, which is a component not illustrated in FIG. 2A. At least some of components illustrated in FIG. 2A may be omitted. For example, the electronic device 200A may include at least some of components of an electronic device 200a of FIG. 5a to be described with reference to FIG. 5.

The first input/output terminal 210 may be electrically connected with an external electronic device (e.g., the external electronic device 102 in FIG. 1), that is, a main device. According to an embodiment, the electronic device 200a may receive power from the external electronic device connected through the first input/output terminal 210, According to another embodiment, the electronic device 200a may transmit a specified signal to the external electronic device through the first input/output terminal 210. According to an embodiment, the external electronic device may change an operating mode of a power supply module, which may be included in the external electronic device, in response to the specified signal. The operating mode may include, for example, the power charging mode or the power discharging mode.

The second input/output terminal 220 may be electrically connected with an external power supply (e.g., the external power supply 103 in FIG. 1), for example, a power adaptor. According to an embodiment, the electronic device 200a may receive power from the external power supply connected through the second input/output terminal 220.

The power supply module 230 may convert power, such as the first power or the second power, which is input through the first input/output terminal 210 or the second input/output terminal 220, to have a specified intensity. For example, the power supply module 230 may convert the input power through DC-DC conversion and transmit the converted power to each of components of the electronic device 200a.

According to an embodiment, the first switch 240 may selectively connect the first input/output terminal 210 with the power supply module 230. For example, the first switch 240 may be turned on to transmit the first power, which is input from the external electronic device through the first input/output terminal 210, to the power supply module 230. For another example, the first switch 240 may be turned off to prevent the first power, which is input from the external electronic device through the first input/output terminal 210, from being transmitted to the power supply module 230, or to prevent the second power, which is input from the external power supply through the second input/output terminal 220, from being transmitted to the first input/output terminal 210. According to various embodiments, the first switch 240 may be a one-way switch which is able to be conducted only in the direction of the power supply module 230 from the first input/output terminal 210, or a two-way switch conducted in any direction. For example, the one-way switch may be a switch allowing a current to flow from a first stage to a second stage but preventing a current from flowing from the second stage to the first stage, when the switch is turned on. For example, the two-way switch may be a switch allowing a current to flow from the first stage to the second stage or from the second stage to the first stage, when the switch is turned on. The one-way switch and the two-way switch may not allow the current to flow through the switch when the switch is turned off.

According to an embodiment, the second switch 250 may selectively connect the second input/output terminal 220 with the power supply module 230. For example, the second switch 250 may be turned on to transmit second power, which is input from the external power supply through the second input/output terminal 220, to the power supply module 230. For another example, the second switch 250 may be turned off to prevent the second power, which is input from the external power supply through the second input/output terminal 220, from being transmitted to the power supply module 230, or to prevent the first power, which is input from the external power supply through the first input/output terminal 210, from being transmitted to the second input/output terminal 220. According to various embodiments, the second switch 250 may be a one-way switch which is able to be conducted only in the direction of the power supply module 230 from the second input/output terminal 220, or a two-way switch conducted in any direction.

According to various embodiments, the power, which is input from the outside through the first input/output terminal 210 or the second input/output terminal 220, may be transmitted to each component of the electronic device 200a through the power supply module 230. Alternatively, the power input from the outside may be transmitted to each component of the electronic device 200a without passing through the power supply module 230.

The first diode 260-1 may electrically connect the first input/output terminal 210 with the power supply module 230, and may be connected with the first switch 240 in parallel. For example, an anode of the first diode 260-1 may be electrically connected with the first input/output terminal 210 and a cathode of the first diode 260-1 may be electrically connected with the power supply module 230.

According to an embodiment, the first diode 260-1 may transmit the first power, which is input through the first input/output terminal 210, under a specified condition to the power supply module 230 even if the first switch 240 is turned off. For example, the first diode 260-1 may transmit the first power to the power supply module 230 when the voltage at the node of the power supply module 230 is lower than a voltage at a node of the first input/output terminal 210 by a specified level or more. Accordingly, the power supply module 230 may receive a voltage having a specified intensity through the first diode 260-1 for a specified time even if the first switch 240 is turned of.

According to an embodiment, the first diode 260-1 may prevent a second voltage, which is input through the second input/output terminal 220, from being transmitted to the first input/output terminal 210. For example, even if the second voltage is supplied to the power supply module 230 in the state that the first switch 240 is turned off, the first diode 260-1 may block the second voltage such that the second voltage is not transmitted to the first input/output terminal 210.

The control circuit 270 may control an operation of each component included in the electronic device 200a and may perform an arithmetic operation. According to various embodiments, the control circuit 270 may include at least one of a micro-control unit (MCU), a central processing unit (CPU), or an application processor (AP).

According to an embodiment, the control circuit 270 may control the operation of the first switch 240 or the second switch 250. For example, the control circuit 270 may determine whether power is input from the outside through the first input/output terminal 210 or the second input/output terminal 220, and may turn on or turn off the first switch 240 or the second switch 250, based on the determination result.

According to various embodiments, the control circuit 270 may transmit a specified signal to the external electronic device using a communication module which may be included in the electronic device 200a. For example, when the electronic device 200a satisfies a specified condition, the control circuit 270 may transmit the specified signal to the external electronic device through the first input/output terminal 210 using the communication module. According to an embodiment, the external electronic device may change an operating mode of a power supply module, which may be included in the external electronic device, in response to the specified signal.

In the disclosure, the component having the same reference numeral as that of the electronic device 200a illustrated in FIG. 2A may have the same description made with reference to FIG. 2A.

Figure 2B:
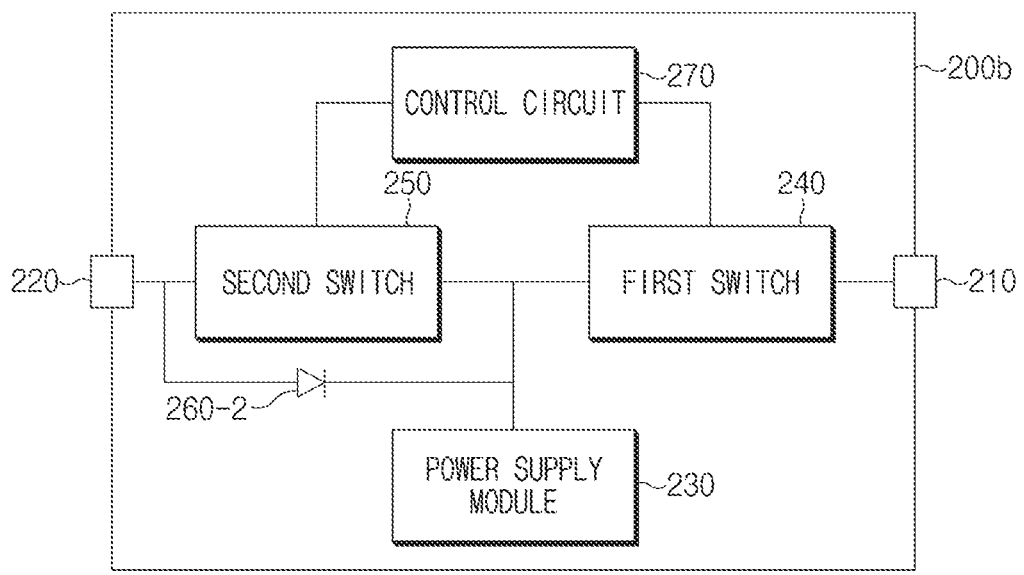
FIG. 2B illustrates a block diagram of an electronic device, according to another embodiment.

FIG. 2B illustrates a block diagram of an electronic device, according to another embodiment.

Referring to FIG. 2B, an electronic device 200b may include the first input/output terminal 210, the second input/output terminal 220, the power supply module 230, the first switch 240, the second switch 250, a second diode 260-2, and the control circuit 270. According to various embodiments, the electronic device 200b is not limited to that illustrated in FIG. 2B. For example, the electronic device 200b may further include a communication module or an output module, which is not illustrated in FIG. 2B. At least some of components illustrated in FIG. 2B may be omitted. In the following description made with reference to FIG. 2B, the duplication of the description made with reference to FIG. 2B will be omitted.

The second diode 260-2 may electrically connect the second input/output terminal 220 with the power supply module 230, and may be connected with the second switch 250 in parallel. For example, an anode of the second diode 260-2 may be electrically connected with the second input/output terminal 220 and a cathode of the second diode 260-2 may be electrically connected with the power supply module 230.

According to an embodiment, the second diode 260-2 may transmit the second power, which is input through the second input/output terminal 220, under a specified condition to the power supply module 230 even if the second switch 250 is turned off. For example, the second diode 260-2 may transmit the second power to the power supply module 230 when the voltage at the node of the power supply module 230 is lower than a voltage at a node of the second input/output terminal 220 by a specified level or more. Accordingly, the power supply module 230 may receive a voltage having a specified intensity through the second diode 260-2 for a specified time even if the second switch 250 is turned of.

According to an embodiment, the second diode 260-2 may prevent a first voltage, which is input through the first input/output terminal 210, to the second input/output terminal 220. For example, the second diode 260-2 may block the first voltage such that the first voltage is not transmitted to the second input/output terminal 220, even if the first voltage is supplied to the power supply module 230 in the state that the second switch 250 is turned of.

In the disclosure, the component having the same reference numeral as that of the electronic device 200b illustrated in FIG. 2B may have the same description made with reference to FIG. 2B.

Figure 2C:
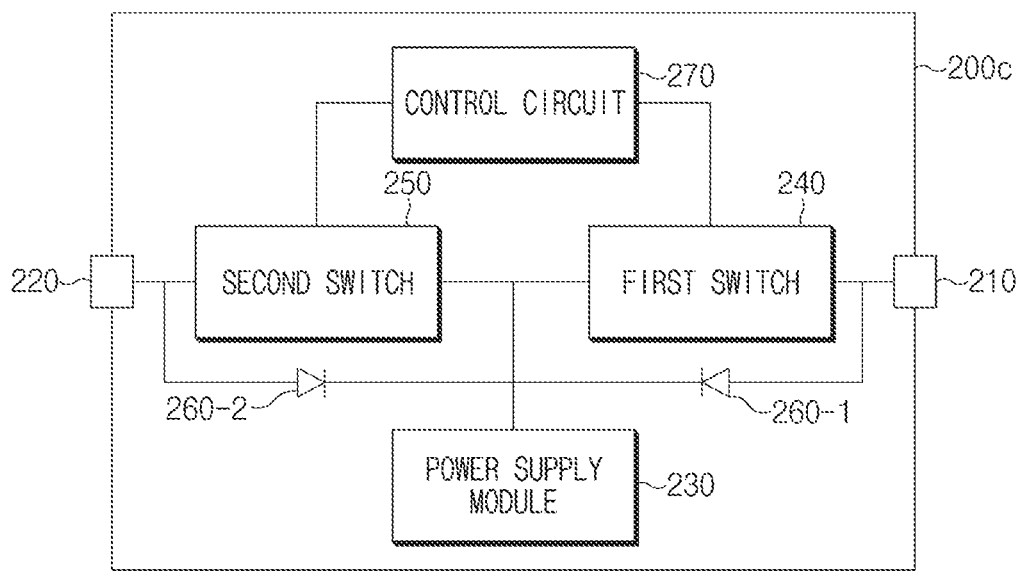
FIG. 2C illustrates a block diagram of an electronic device, according to another embodiment.

FIG. 2C illustrates a block diagram of an electronic device, according to another embodiment.

Referring to FIG. 2C, an electronic device 200c may include the first input/output terminal 210, the second input/output terminal 220, the power supply module 230, the first switch 240, the second switch 250, the first diode 260-1, the second diode 260-2, and the control circuit 270. According to various embodiments, the electronic device 200c is not limited to that illustrated in FIG. 2C. For example, the electronic device 200c may further include a communication module or an output module, which is not illustrated in FIG. 2C. At least some of components illustrated in FIG. 2C may be omitted. In the following description made with reference to FIG. 2C, the duplication of the description made with reference to FIG. 2A or 2B will be omitted to avoid redundancy.

According to an embodiment, the electronic device 200c may include both the first diode 260-1 and the second diode 260-2. According to an embodiment, the first diode 260-1 or the second diode 260-2 allows first power or second power to be supplied to the electronic device 200c during a time that the first switch 240 or the second switch 250 is turned off. According to an embodiment, the first diode 260-1 or the second diode 260-2 may block the second power or the first power from being unnecessarily transmitted to the external electronic device or the external power supply.

According to various embodiments, the first diode 260-1 and the second diode 260-2 may seamlessly maintain the supply of the power to the electronic device 200c and may prevent the power from flowing back.

Figure 2D:
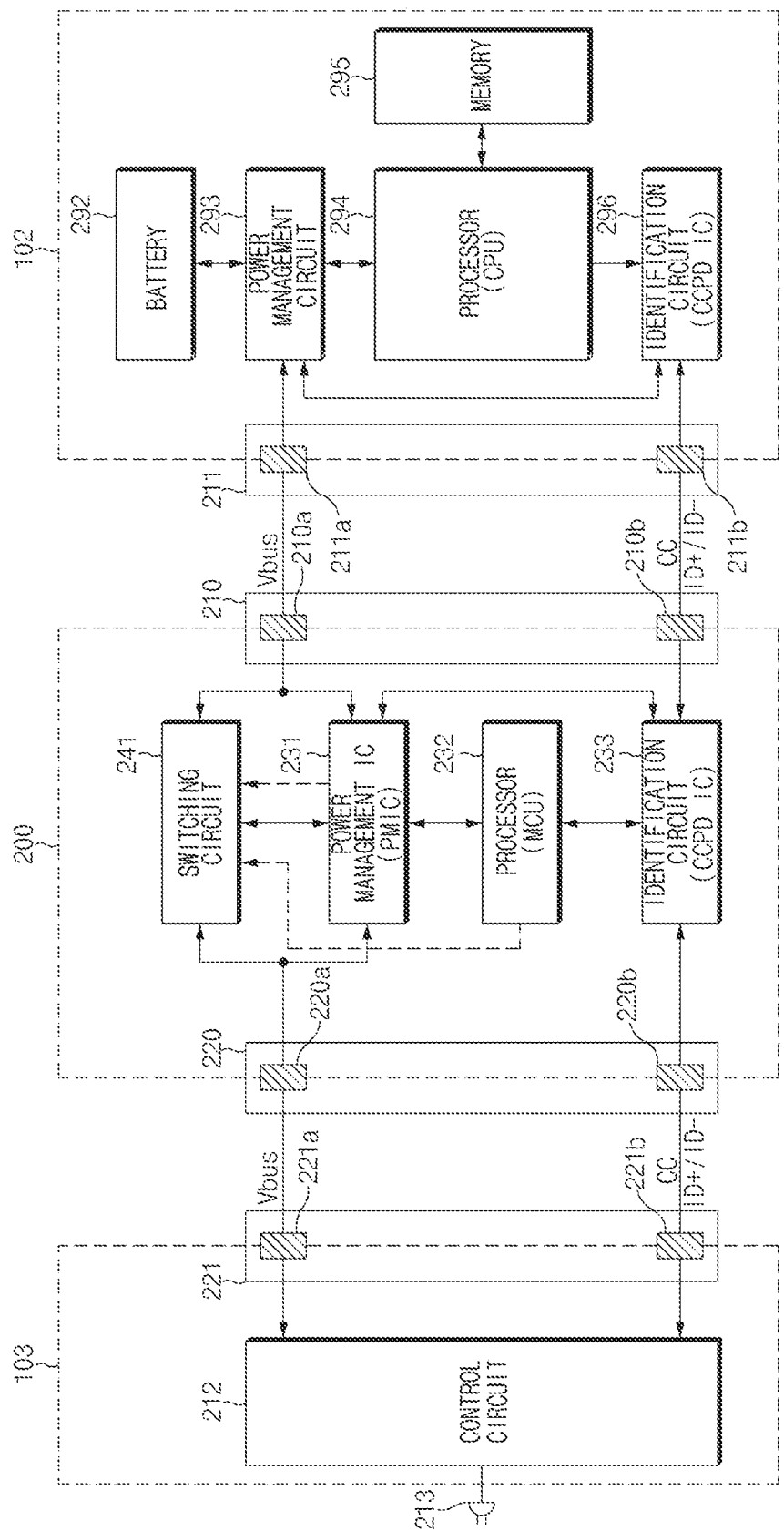
FIG. 2D illustrates the connection of an electronic device, according to various embodiments.

FIG. 2D illustrates the connection of an electronic device, according to various embodiments.

FIG. 2D is a view illustrating a detailed structure of a system, according to various embodiments. Referring to FIG. 2D, according to various embodiments, an electronic device 200 (e.g., the electronic device 200a, 200b, or 200c in FIGS. 2A, 2B, and 2C) may operate in connection with the external electronic device 102 (e.g., the smartphone) or the external power supply 103 (e.g., TA).

The electronic device 200 may correspond to an accessory device operatively connected with the external electronic device 102. Although the electronic device 200 is illustrated, for example, separately from the external electronic device 102, the electronic device 200 may be implemented integrally with the external electronic device 102. For example, the external electronic device 102 may be positioned inside the electronic device 200 or may be configured as one component inside the electronic device 200.

The external electronic device 102 may be functionally connected with the electronic device 20. For example, the external electronic device 102 may be a smartphone. However, according to an embodiment, the external electronic device 102 is not limited to the smartphone. For example, the external electronic device 102 may include a mobile terminal device such as a tablet PC or a PDA.

The external power supply 103 may include an auxiliary accessory device electrically connected with the electronic device 200. For example, the external power supply 103 may include a charging device which is able to supply power. The charging device may include, for example, a notebook computer, a traveling charging device (terminal adapter TA), or an auxiliary battery.

The electronic device 200 and the external electronic device 102 may be connected with each other through a wired communication interface. According to various embodiments, the electronic device 200 and the external electronic device 102 may be connected with each other through a video communication interface (for example, an HDMI interface, a DisplayPort interface, an MHL interface, a USB interface). The external electronic device 102 may be a source device to generate content data e.g., video data), and the electronic device 200 may operate as a sink device to receive and output or reproduce the content. In addition, the reverse of the above description is possible. According to various embodiments, the electronic device 200 and the external electronic device 102 may be connected with each other through a USB communication interface. The external electronic device 102 may operate as a USB host, and the electronic device 200 may operate as a USB client. In addition, the reverse of the above description is possible.

The electronic device 200 and the external electronic device 102 may be connected with each other through a connector. The connector may transmit analog data or digital data to the inside or the outside of a device. The connector may transmit power to the inside or the outside of the device. According to various embodiments, the connector may be a USB type C connector. The electronic device 200 and the external electronic device 102 may mutually transmit data and power through the USB type C connector. According to various embodiments, the electronic device 200 and the external electronic device 102 may be connected with each other in an alternate mode, when connected with each other through the USB Type C connector. For example, a video signal of a video communication interface (e.g., a Display Port interface of VESA) may be transmitted or received through a USB connector.

According to various embodiments, the types of the wired communication interface and a connector used by the electronic device 200 and the external electronic device 102 are not limited to any one type.

When the electronic device 200 is electrically connected with the external electronic device 102, the electronic device 200 may receive power from the external electronic device 102. For example, the electronic device 200 may receive power from the external electronic device 102 through the power supply terminal (e.g., a V-BUS terminal of a USB connector) of the connector. The electronic device 200 may be driven by using power supplied from the external electronic device 102.

The electronic device 200 may receive power from the external power supply 103 when electrically connected with the external power supply 103. In this case, the electronic device 200 may be driven using power supplied from the external power supply 103, and may request the external electronic device 102 to stop supplying power. When the connection of the external power supply 103 is detected, the electronic device 200 may transmit, to the external electronic device 102, state information for indicating that the external power supply 103 is connected.

The state information may be transmitted to the external electronic device 102 through a data communication terminal (e.g., D+ and D− terminals, Rx and Tx terminals, or a CC terminal of a USB connector). The data communication terminal may include, for example, a positive data communication terminal (D+) and a negative data communication terminal (D−) of the USB interface. According to another example, the state information may be transmitted to the external electronic device 102 through a terminal (e.g., in a manner similar to the ID terminal of a micro USB connector) for transmitting a variable resistance signal of the connector.

When the electronic device 200 is electrically connected with the external power supply 103, the electronic device 200 may supply power to the external electronic device 102. For example, the electronic device 200 may, supply power to the external electronic device 102 through the power supply terminal (e.g., V_BUS) of the USB interface. The external electronic device 102 may be driven using power supplied from the electronic device 200.

The state information may be a data type corresponding to a USB device class for communication with, for example, a keyboard, a mouse, touch, a virtual reality sensor, an audio or video device. In this case, the state information may be generated in the form of one of a key value, a mouse coordinate value, a touch coordinate value, a virtual reality sensor value, or an audio or video device control signal value. For example, when the keyboard device class is used, and when the connection with the external power supply 103 is sensed, the electronic device 200 may generate a key value (e.g., 0x2fd or 0x2fe) corresponding to the set key as a key set in advance is pressed, as the state information, and may transmit the generated key value to the external electronic device 102 through the data communication terminal.

The state information may have mutually different values when the external power supply 103 is connected in the state that the electronic device 200 and the external electronic device 102 are connected with each other, and when the external electronic device 102 is connected in the stat that the electronic device 200 and the external power supply 103 are connected with each other. For example, when the external power supply 103 is connected in the state that the electronic device 200 and the external electronic device are connected with each other, the state information may be "0x2fd". When the external electronic device 102 is connected in the state that the electronic device 200 and the external power supply 103 are connected with each other, the state information may be "0x2fe".

The electronic device 200 and the external electronic device 102 may transmit or receive information on each other and may identify each other through the ID terminal of the connector. According to various embodiments, the state information may be, for example, a data type which may be transmitted or received through the ID terminal of the connector.

According to an embodiment, the connector may include an ID terminal supporting a 'digital ID' scheme (e.g., a CC terminal in a USB Type C connector). According to various embodiments, the state information may be a data type which may be transmitted or received through a digital ID terminal included in the connector.

According to various embodiments, the connector may include an ID terminal to support a 'resistance ID' scheme (e.g., an ID terminal of a micro USB connector). According to various embodiments, the state information may be a data type transmitted in a manner of changing a resistance value through the 'resistance ID' terminal included in the connector.

A portion of power supplied from the external power supply 103 may be used to drive the electronic device 200. Another portion of the power may be supplied to the external electronic device 102 through the above-described power supply terminal. For example, the external electronic device 102 may be driven by using power of the external power supply 103, which is supplied through the electronic device 200, and may charge a battery 292 electrically connected with the external electronic device 102.

According to various embodiments, the electronic device 200 may transmit the state information indicating that the external power supply 103 is connected, to the external electronic device 102 through data communication (e.g., software information). The electronic device 200 may transmit a request the external electronic device 102 to stop supplying power, when the external power supply 103 is connected.

The electronic device 200, the external electronic device 102, and the external power supply 103 may be connected with each other through various communication interfaces. For example, the electronic device 200 may include a high definition multimedia interface (HDMI), an optical interface, a D-SUB terminal or a lightening terminal. The electronic device 200 may be connected with the external electronic device 102, or the external power supply 103, based on at least one of the HDMI, the optical interface, the D-SUB terminal or the lighting terminal.

The electronic device 200 may include a processor 232 (e.g., a micro controller unit (MCU)) (e.g., the control circuit 270 in FIG. 2A, 2B, or 2C), a power management IC 231 (e.g., the power supply module 230 in FIGS. 2A, 2B, and 2C), an identification circuit 233 (e.g., CCPD IC), the first input/output terminal 210, the second input/output terminal 220, a switching circuit 241 (e.g., the first switch 240, the second switch 250, the first diode 260-1, and/or the second diode 260-2 in FIGS. 2A, 2B, and 2C), and/or a storage unit (not illustrated).

The processor 232 may control the operation of the electronic device 200 and/or the signal flow between blocks of the electronic device 200, and may perform a data processing function for processing data. For example, the processor 232 may include a central processing unit (CPU), an application processor (AP), a micro controller unit (MCU), or a microprocessor unit (MPU). The processor 232 may include a single core processor or a multi-core processor.

The processor 232 may notify the external electronic device 102 of a state change (such as detachment of the external power supply 103) of the electronic device 200. For example, when the external power supply 103 is disconnected from the electronic device 200, the processor 232 may recognize the disconnection through an interrupt signal line connected with the second input/output terminal 220, The processor 232 may communicate with the external electronic device 102 to notify a state change of the electronic device 200. For example, when the external power supply 103 is connected with the electronic device 200, the processor 232 may recognize the connection through the interrupt signal line connected with the second input/output terminal 220. The processor 232 may communicate with the external electronic device 102 to notify the state change of the electronic device 200. The processor 232 may transmit, to the external electronic device 102, a request to stop supplying power.

The power management IC 231 may control a voltage of power supplied to each component included in the electronic device 200. The power management IC 231 may output a preset voltage (e.g., 3.0 V). For example, the power management IC 231 may include a low drop-out voltage regulator (LDO).

The power management IC 231 may receive power from the external electronic device 102 or the external power supply 103 and may output the preset voltage (e.g., 3.0 V). For example, when the connection with only the external electronic device 102 is made without the connection of the external power supply 103, the power management IC 231 may receive power supplied through a power supply terminal (V_BUS) 210a of the first input/output terminal 210 to output the preset voltage. Alternatively, when the external power supply 103 is connected to the electronic device 200, the power management IC 231 may receive power supplied from the external power supply 103 through the second input/output terminal 220 and may output the preset voltage.

The identification circuit 233 may transmit, to the processor 232, data received through a data communication terminal 210b of the first input/output terminal 210, and may transmit a message or information generated from the processor 232 to the external electronic device 102 through the data communication terminal 210h of the first input/output terminal 210. The identification circuit 233 may include at least one of a micro-usb interface controller (MUIC), a cable and connector integrated chip (CCIC), or a power delivery integrated chip (PDIC). According to various embodiments, the identification circuit 233 may determine the connection with or the disconnection from the external electronic device 102 or the external power supply 103. For example, when the first input/output terminal 210 or the second input/output terminal 220 is a connector to support the USB C type, the electronic device 200 may determine, through a CC, line, whether the external electronic device 102 is connected or disconnected, or whether the external power supply 103 is connected or disconnected.

The storage unit (not illustrated) may store application programs necessary for other optional functions, such as an audio reproducing function, or an image or moving picture reproducing function in addition to an operating system (OS).

The storage unit may store various pieces of information and programs necessary to control a method of managing power according to an embodiment of the disclosure. For example, the program may include a routine of sensing the connection of the external power supply 103, a routine of controlling an ON/OFF state of the switching circuit 241 depending on the connection of the external power supply 103, or a routine of generating state information for notifying the connection of the external power supply 10.

The first input/output terminal 210 may include a device for the functional connection with the external electronic device 102. The first input/output terminal 210 includes the power supply terminal 210a to supply or receive power, the data communication terminal 210b for data communication with the external electronic device 102, and/or a ground terminal (not illustrated). The arrangement of the power supply terminal 210a and the data communication terminal 210h is not limited to that in FIG. 2D and may be modified depending on the characteristics of the electronic device 200. The power supply terminal 210a may be referred to as a first pin, and the data communication terminal 210h may be referred to as a second pin. According to various embodiments, the first pin or the second pin may be implemented with one pin or a plurality of pins.

According to various embodiments, the first input/output terminal 210 may have a USB connector standard. In this case, the power supply terminal 210a may correspond to a VB_LIS terminal of the USB connector, and the data communication terminal 210h may correspond to a D+, D−, Tx, or Rx terminal.

The power supply terminal 210a may receive power transmitted from the external electronic device 102 and may transmit power transmitted from the external power supply 103 to the external electronic device 102.

The data communication terminal 210b may include, for example, a D+ or D− terminal, and/or a Tx+/− or Rx+/− terminal. Various terminal names may be employed depending on the connectors. The electronic device 200 may transmit and receive information with the external electronic device 102 through the data communication terminal 210b.

The second input/output terminal 220 may include a device to electrically connect the external power supply 103. The second input/output terminal 220 may include a power supply terminal 220a to supply or receive power, a data communication terminal 220b for data communication with the external power supply 103, and/or the ground terminal (not illustrated), The arrangement of the power supply terminal 220a, and the data communication terminal 220b is not limited to FIG. 21) and may be modified depending on the characteristics of the electronic device 200. The second input/output terminal 220 may further include a terminal to identify the type of the external power supply 103. The second input/output terminal 220 may include a USB interface standard, similarly to the first input/output terminal 210. Accordingly, the second input/output terminal 220 may have the feature and the operation similar to those of the first input/output terminal 210. The power supply terminal 220a may be referred to as a third pin, and the data communication terminal 220b may be referred to as a fourth pin. According to various embodiments, the third pin or the fourth pin may be implemented with on pin or a plurality of pins.

A connection detecting circuit (not illustrated) may determine the detachment of an external electronic device (e.g., the external power supply 103) connected with the first pin through the second input/output terminal 220. For example, the connection detecting circuit may determine whether the external power supply 103 is connected to or disconnected from the electronic device 200, through the second input/output terminal 220. In addition, the connection detecting circuit may transmit information associated with the connection to or disconnection from the external power supply 103 to the processor 232.

Meanwhile, although not illustrated in FIG. 2D, according to an embodiment of the disclosure, the electronic device 200 may further selectively include components including an input module, such as a touch pad, a button key, or a touch key, a digital sound reproducing module, and/or various sensor modules such as an infrared sensor module, an illuminance sensor module, or a display module. In addition, according to various embodiments, the electronic device 200 may further include components equivalent to those of the above-mentioned components.

The external electronic device 102 includes a processor 294 (e.g., a central processing unit (CPU) or an application processor (AP)), a power management IC 293, the battery 292, a connector 221, an identification circuit 296 and/or a memory 295

A connector 211 may include a device operatively connected with the electronic device 200. The connector 211 may include a power supply terminal 211a to supply or receive power, a data communication terminal 211b for data communication with the electronic device 200, and/or the ground terminal (not it lustrated). In the disclosure, the power supply terminal 211a may be referred to as a first pin, and the data communication terminal 211b may be referred as a second pin.

According to various embodiments, the connector may have the standard of the USB connector. In this case, the power supply terminal 211a may correspond to a VBUS terminal of the USB connector, and the data communication terminal 211b may correspond to a D+ or D− terminal or a Tx. or Rx terminal.

The power supply terminal 211a may receive power transmitted from the external power supply 103 through the electronic device 200. The data communication terminal 211b may include, for example, a D+ or D− terminal, and/or a Tx+/− or Rx+/− terminal. Various terminal names may be employed depending on the connectors. The external electronic device 102 may transmit and receive information with the external electronic device 200 through the data communication terminal 211b.

The battery 292 may supply power to each component included in the external electronic device 102. The battery 292 may be, for example, a rechargeable secondary battery. The battery 292 may be, for example, a battery electrically connected to the external electronic device 102, a built-in battery embedded in the external electronic device 102, or a detachable battery detachable by a user.

The memory 295 may store an operating system (OS) of the external electronic device 102 and application programs necessary for other optional functions, such as an audio reproduction function, or an image or moving picture reproduction function.

The power management IC 293 may manage power supplied to the external electronic device 102. The power management IC 293 may include a power management integrated circuit (PMIC) (not illustrated), a voltage regulating unit (not illustrated), a power input/output unit, and a charger integrated circuit (IC) (not illustrated). In addition, the power management IC 293 may include the combination of various ICs, various circuits, and software to perform a function of controlling power or regulating a voltage.

When the electronic device 200 and the external power supply 103 are connected with each other, the power management IC 293 may receive power from the external power supply 103 through the power supply terminal 211a of the connector 211. In addition, when the connection between the electronic device 200 and the external power supply 103 is released, the power management IC 293 may supply power to the electronic device 200 through the power supply terminal 211a of the connector 211.

As described above, the power management IC 293 may supply power from the battery 292 to the electronic device 200 to correspond to the state of the external electronic device 102, or may charge the battery 292 with power supplied from the outside.

The processor 294 of the external electronic device 102 may control the overall operation of the external electronic device 102 and the signal flow between the internal blocks of the external electronic device 102, and perform a data processing function of processing data. For example, the processor 294 of the external electronic device 102 may include a central processing unit (CPU) or an application processor. The processor 294 of the external electronic device 102 may include a single core processor or a multi-core processor. Alternatively, the processor 294 of the external electronic device 102 may include a plurality of processors.

The processor 294 of the external electronic device 102 may receive, from the electronic device 200, a notification of whether the electronic device 200 is connected with the external power supply 103, or whether the electronic device 200 and the external power supply 103 is disconnected from each other. The processor 294 of the external electronic device 102 may control the operation of the power management IC 293 based on this notification.

The identification circuit 296 may be connected with the ID terminal of the connector 211, may determine an external device connected with the connector 211, and may transmit information on an external device (for example, the electronic device 200) to the processor 294 of the external electronic device 102. Although the identification circuit 296 is implemented in the form of a chip independent from the processor 294 of the external electronic device 102 as illustrated, the identification circuit 296 may be implemented as a portion of the processor 294 of the external electronic device.

For example, in the case of a USB type C connector, the ID terminal may correspond to a CC terminal, and the identification circuit 296 may correspond to a configuration channel integrated circuit (CCIC). The USB connector may have two CC terminals. For example, as the CCIC (corresponding to reference numeral 296 in the drawing) determines the directionality of a cable connected with the connector 211, one may be used to transmit power to the cable (or the external electronic device), and a remaining one may communicate with a counterpart device connected through the cable to determine a device connected to the connector 211 and to manage the connection.

According to various embodiments, the identification circuit 296 may be omitted. In other words, according to various embodiments, the external electronic device 102 may be implemented without the identification circuit 296. The external electronic device 102 may operate in a charging mode, an On The Go (OTG) mode, or a Power Path mode (e.g., discharging mode) in response to the control of the processor 294 of the external electronic device 102.

The charging mode may be a mode of charging the battery 292 using power input from the outside. For example, the external electronic device 102 may charge the battery 292 with power supplied from the power supply terminal 211a through the power management IC 293. According to an embodiment, when operating in the charging mode, the external electronic device 102 may supply a portion of power, which is received from the outside, to the battery 292 through the power management IC 293, and may supply a remaining portion of the power to components, such as the processor 294 or the identification circuit 296 of the external electronic device, of another mobile terminal.

The OTG mode is a mode in which the external electronic device 102 may supply power to various external devices, such as a mouse, a keyboard, and a USB memory, connected through a connectable interface. According to an embodiment, when the electronic device 200 is connected to the external electronic device 102, the external electronic device 102 may operate in an OTG mode, and may supply the power of the battery 292 to the electronic device 20 through the power supply terminal 211a.

A Power Path mode is a mode in which the power, which is input to the external electronic device 102 through the power management IC 293, is not supplied to the battery 292, but the power management IC 293 supplies the power to components of another mobile terminal. For example, according to an embodiment, the external electronic device 102 may receive a portion of power from the external power supply 103 electrically connected with the electronic device 200 and may supply the power to the power management IC 293 without supplying the power to the battery 292.

The external power supply 103 may include a control circuit 212, the connector 221, and a power connector 213.

The connector 221 may include a device operatively connected with the electronic device 200, The connector 221 may include a power supply terminal 221a to supply or receive power, a data communication terminal 221b for data communication with the electronic device 200, and/or the ground terminal (not illustrated). In the disclosure, the power supply terminal 221a may be referred to as a fifth pin, and the data communication terminal 221b may be referred as a sixth pin.

According to various embodiments, the connector 221 may have a USB connector standard. In this case, the power supply terminal 221a may correspond to a VBUS terminal of the USB connector, and the data communication terminal 221b may correspond to a D+ or D− terminal or a Tx or Rx terminal.

The external power supply 103 may receive commercial power through the power connector 221 and may supply the power to the electronic device 200 through the power supply terminal 221a. The data communication terminal 221b may include, for example, a D+ or D− terminal and/or a Tx+/− or Rx+/− terminal. Various terminal names may be used depending on the connectors. The external power supply 103 may transmit and receive information with the electronic device 200 through the data communication terminal 221b.

According to an embodiment, the external power supply 103 may communicate with the electronic device 200. For example, the external power supply 103 may communicate with the electronic device 200 through the connector 221. For example, the external power supply 103 may make power delivery (PD) communication with the electronic device 200 through a CC terminal of the connector 221.

Figure 3:
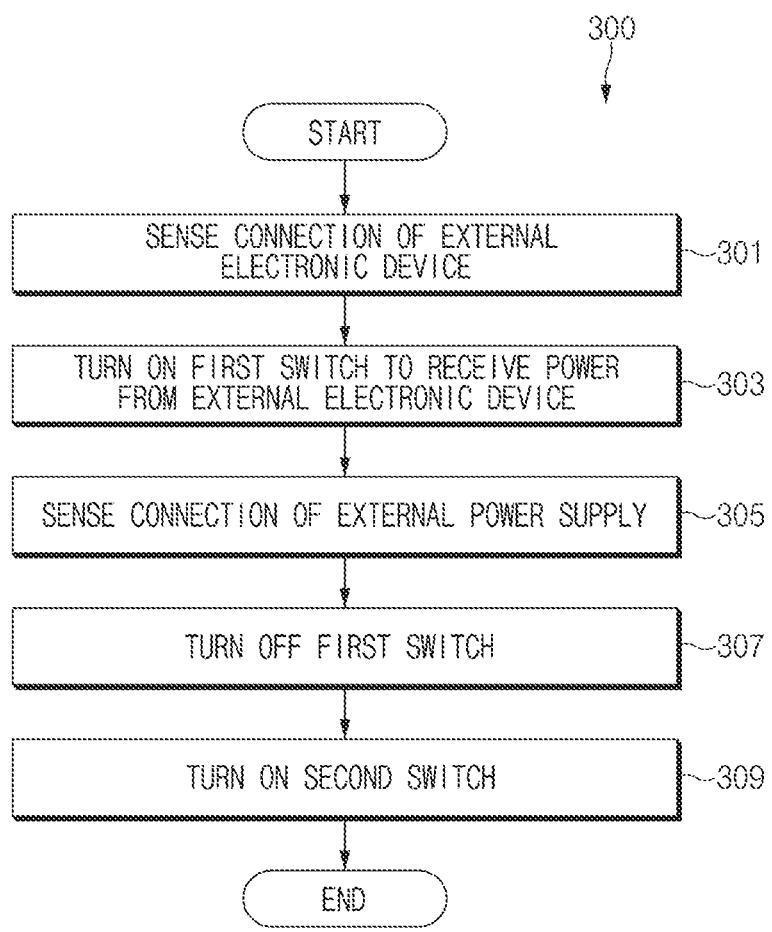
FIG. 3 is a flowchart illustrating a method for changing a power source to supply power of an electronic device, according to an embodiment.

FIG. 3 is a flowchart illustrating a method for changing a power source to supply power of an electronic device, according to an embodiment;

Referring to FIG. 3, the method for changing the power source to supply power to the electronic device may include operation 301 to operation 309. According to various embodiments, operation 301 to operation 309 may be understood as being performed by the electronic device 200a, 200b, 200c, or 200d illustrated in FIG. 2A to 2D or the control circuit 270.

The electronic device may turn off a second switch (e.g., the second switch 250 of FIG. 2A). According to various embodiments, the electronic device may be a peripheral device employing the external electronic device (e.g., the external electronic device 102 in FIG. 1) as a main device. The electronic device may turn on the second switch only when the external power supply is connected with the second input/output terminal (e.g., the second input/output terminal 220 in FIG. 2A) and when a specified condition is satisfied, in the state that the second switch is turned off. The electronic device may control the second switch to be turned off, when receiving power from the external electronic device.

According to various embodiments, the electronic device may maintain the first switch to be turned on to receive power in response to the connection of the external electronic device. The electronic device may maintain the first switch to be turned off to receive power after a specified time is elapsed from the connection of the external electronic device.

In operation 301, the electronic device may sense the connection of the external electronic device. For example, the electronic device may sense the connection of the external electronic device through the first input/output terminal (e.g., the first input/output terminal 210 in FIG. 2A)

In operation 303, the electronic device may turn on the first switch to receive power from the external electronic device. According to an embodiment, the first switch may be in an ON state. For example, operation 303 may be omitted, and the electronic device 200 may directly receive power from the external electronic device in response to operation 301. For example, first power may be supplied to the power supply module of the electronic device or the components of the electronic device.

In operation 305, the electronic device may detect connection of the external power supply in the state that power is supplied from the external electronic device. The state of the second switch may be an OFF state, when the electronic device receives power from the external electronic device. For example, the electronic device may sense the connection of the external power supply through the second input/output terminal. In this case, the second switch is in the OFF state, so the power supplied from the external power supply through the second switch may be cut off.

According to an embodiment, when the electronic device does not include a second diode as illustrated in FIG. 2A, the electronic device may receive power from the external electronic device while the supply of power from the external power supply may be cut off in operation 305.

According to an embodiment, when the electronic device includes a second diode (e.g., the second diode 260-2 of FIG. 2B) as illustrated in FIG. 2B or 2C, the electronic device may receive the second power from an external power supply through the second diode. When the electronic device includes the second diode, the first power from the external electronic device may be blocked from being transmitted to the external power supply by the second diode and the second switch which is turned off. However, the second power supplied from the external power supply may be transmitted to the external electronic device because the first switch is turned on. Accordingly, to prevent such a situation, the first switch 240 in the electronic device illustrated in FIG. 2B or 2C may be a one-way switch that may be conducted only in the direction of the power supply module (e.g., the power supply module 230 in FIG. 2A) from the first input/output terminal 210. For another example, in the electronic device illustrated in FIG. 2B or 2C, the first switch 240 may be a two-way switch. In this case, the electronic device may further include a protective circuit to prevent damage from being caused due to the transmission from the external power supply. In addition, the external electronic device may further include a protective circuit to prevent the power, which is supplied from the external electronic device, from being excessively supplied through the electronic device.

In operation 307, the electronic device may turn off the first switch. Both the first switch and the second switch may be turned of.

For example, referring to FIG. 2A, the electronic device may receive the first power from the external electronic device through a first diode the first diode 260-1 in FIG. 2A). The electronic device may receive the first power from the external electronic device through the first diode 260-1, when the electronic device includes only the first diode 260-1 without the second diode as illustrated in FIG. 2A.

For example, referring to FIG. 2B, when the electronic device includes only the second diode 260-2 without the first diode as illustrated in FIG. 2B, the electronic device may receive the second power from the external power supply through the second diode 260-2.

For example, referring to FIG. 2C, When the electronic device includes the both first diode 260-1 and the second diode 260-2 as illustrated in FIG. 2C, the electronic device may receive the first power from the external electronic device through the first diode 260-1 or may receive the second power through the second diode 760-2.

In operation 307, because both the first switch and the second switch are in an OFF state, the first power from the external electronic device may not be transmitted to the external power supply and the second power from the external power supply may not be transmitted to the external electronic device. In operation 307, in the state in which both the first switch and the second switch are turned off, the first power or the second power may be transmitted to the relevant component of the power supply module or the electronic device through the first diode or the second diode.

According to an embodiment, the electronic device may change the operating mode of the external electronic device from the power discharging mode to the power charging mode, before operation 309 after operation 307. For example, after turning off the first switch in operation 307, the electronic device may transmit a signal for changing the operation mode of the external electronic device from the power discharging mode to the power charging mode, to the external electronic device through the first input/output terminal.

In operation 309, the electronic device may turn on the second switch. The electronic device may receive the second power input from the external power supply through the second switch. For example, the second power may be transmitted to the power supply module or components of the electronic device.

For example, referring to FIG. 2A, when the electronic device includes the first diode 260-1 as illustrated in FIG. 2A, the second power, which is supplied from the external power supply through the second switch, may be blocked from being transmitted to the external electronic device, by the first diode 260-1 and the first switch 240 which is in an OFF state. For example, even if the first switch 240 is turned off, the first power may be supplied from the external electronic device through the first diode 260-1. In this case, according to an embodiment, to prevent the first power, which is supplied from the external electronic device, from being transmitted to the external power supply through the second switch 250, the second switch 250 of the electronic device illustrated in FIG. 2A may be a one-way switch which is able to be conducted only in the direction of the power supply module 230 form the second input/output terminal 220.

For example, referring to FIG. 2B, when the electronic device does not include the first diode as illustrated in FIG. 2B, in operation 309, the supply of the second power from the external electronic device may be cut off. For example, the electronic device may receive only the first power from the external power supply.

For example, referring to FIG. 2C, when the electronic device includes the first diode 260-1 and the second diode 260-2 as illustrated in FIG. 2C, the second power, which is supplied from the external power supply through the second switch 250, may be blocked from being transmitted to the external electronic device, by the first diode 260-1 and the first switch 240 which is in an OFF state. For example, even if the first switch 240 is turned off, the first power may be supplied from the external electronic device through the first diode 260-1. In this case, according to an embodiment, to prevent the first power, which is supplied from the external electronic device, from being transmitted to the external power supply through the second switch 250, the second switch 250 of the electronic device illustrated in FIG. 2C may be a one-way switch which is able to be conducted only in the direction of the power supply module 230 from the second input/output terminal 220.

Through operation 301 to operation 309, even if the power source to supply power is switched from the external electronic device to the external power supply, the electronic device may prevent the supplied power from being reduced to a specified level or less. Accordingly, the electronic device may prevent an abnormal operation through the above operation. In addition, the electronic device may prevent the damage to the external electronic device or the external power supply when the power source to supply the power is switched.

Figure 4:
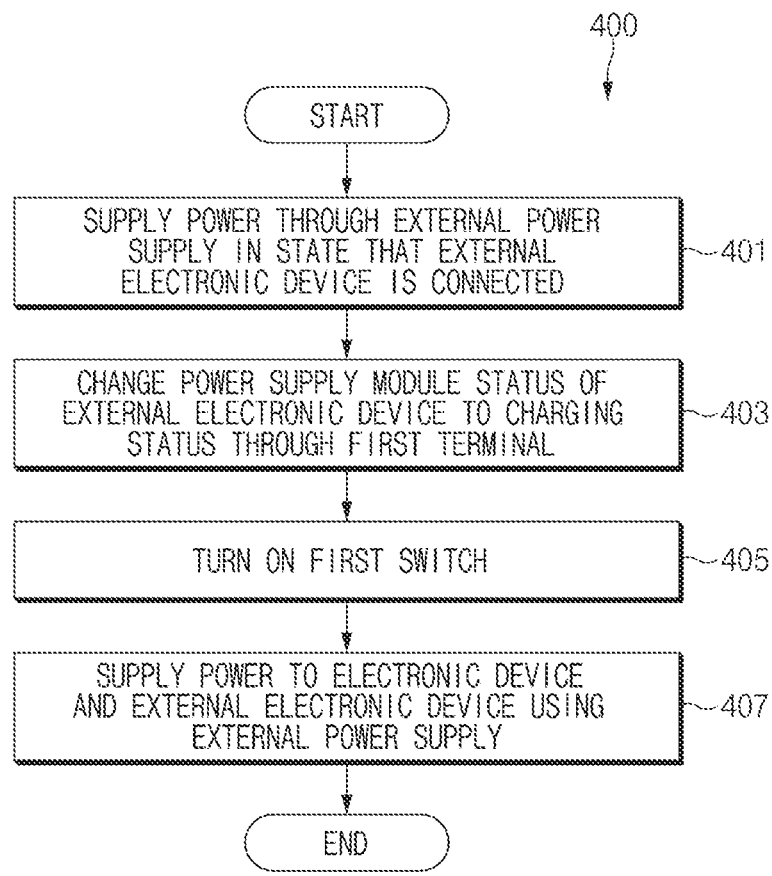
FIG. 4 illustrates a flowchart of a method for supplying power to an electronic device and an external electronic device from the outside, according to an embodiment.

FIG. 4 illustrates a flowchart of a method for supplying power from the outside to the electronic device and the external electronic device, according to an embodiment.

Referring to FIG. 4, a method 400 for supplying power to the electronic device and the external electronic device (e.g., the external electronic device 102 of FIG. 1) may include operation 401 to operation 407. According to various embodiments, operation 401 to operation 407 may be understood as being performed by the electronic device or the control circuit illustrated in FIGS. 2A to 2C. In the following description made with reference to FIG. 4, the duplication of the description made with reference to FIG. 3 will be omitted.

In operation 401, the electronic device may receive power through an external power supply (e.g., the external power supply 103 in FIG. 1) in the state that the electronic device is connected with the external electronic device. For example, the electronic device may receive the second power from the external power supply, as the power source to supply power is switched in the state that the electronic device is connected with the external electronic device through operation 301 to operation 309 illustrated in FIG. 3. For example, the electronic device may be in the state that the electronic device receives the second power by turning on the second switch. For example, the second power may be transmitted to the power supply module or components of the electronic device.

In operation 403, the electronic device may change, to the charging state, the operating state of the power supply module (e.g., the power management IC 293 in FIG. 2D) included in the external electronic device through the first input/output terminal (e.g., the first input/output terminal 210 in FIGS. 2A to 2D). For example, the electronic device may transmit a specified signal to the external electronic device through the first input/output terminal using the communication module (e.g., the identification circuit 233 in FIG. 2D) that is able to be included in the electronic device. In operation 401, the operating state of the power supply module, which is included in the external electronic device, may be a power discharging mode, and the external electronic device may change the operating state of the power supply module to the power charging mode, in response to a specified signal transmitted from the electronic device. In operation 403, the electronic device may receive the second power from the external power supply. In this case, the power may not be supplied to the electronic device from the external electronic device even if the electronic device includes the first diode (e.g., the first diode 260-1 in FIG. 2A) as illustrated in FIG. 2A or 2C.

In operation 405, the electronic device may turn on the first switch (e.g., the first switch 240 in FIGS. 2A to 2C). In this case, even if the first switch is turned on, the operating state of the power supply module included in the external electronic device is not the power discharging mode. Accordingly, the power may not be supplied to the electronic device from the external electronic device. However, the electronic device may receive the second power input from the external power supply.

In operation 407, the electronic device may receive power from the external power supply, and may transmit at least a portion of the second power, which is input from the external power supply, to the external electronic device. For example, the operating state of the power supply module included in the external electronic device may be the power charging mode, and the first switch is turned on. Accordingly, the second power input from the external power supply may be transmitted to the external electronic device. In this case, the first switch may be a two-way switch to transmit the second power to the external electronic device.

The electronic device and the external electronic device may receive power from the external power supply through operation 401 to operation 407.

The following description will be made with reference FIGS. 5A to 5D, regarding a process in which the electronic device 200a charges the external electronic device 102 with power through the external power supply 103. Hereinafter, for example, it may be assumed that the electronic device 200a has the same structure as that of the electronic device 200a in FIG. 2A.

Figure 5A:
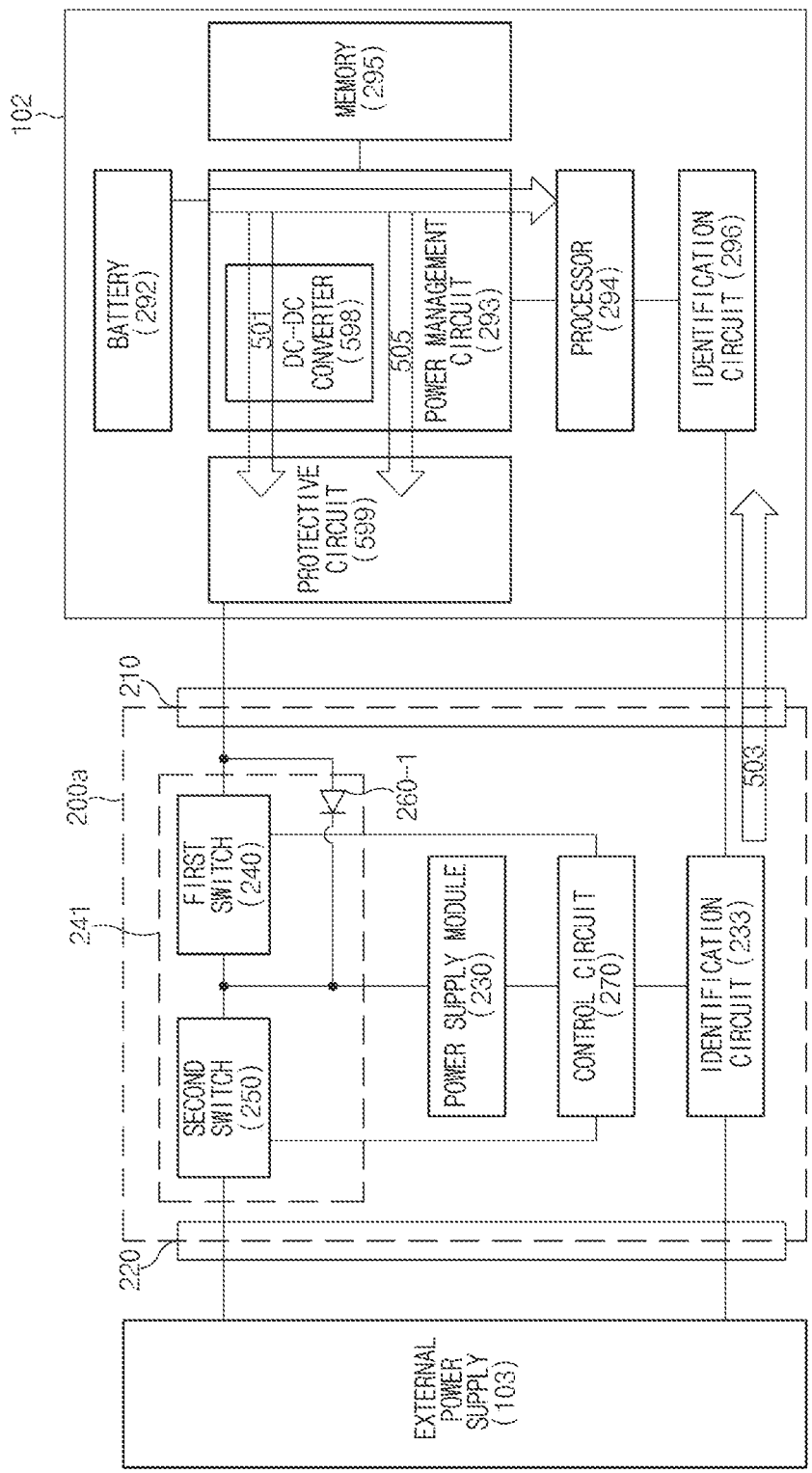
FIG. 5A is a view illustrating the flow of power of an external electronic device as the external electronic device is connected with an electronic device.

FIG. 5A is a view illustrating the flow of power of the external electronic device, as the external electronic device 102 is connected with the electronic device 200a.

In FIG. 5A, it is assumed that the external power supply 103 is not connected with the electronic device 200a or the second switch 250 is in an OFF state.

Referring to reference numeral 503, according to an embodiment, the electronic device 200a may transmit identification information to the external electronic device 102. For example, the electronic device 200a may allow the external electronic device 102 to supply a specified voltage by transmitting the identification information of the electronic device 200a. According to various embodiments, when sensing that the connection with the external electronic device 102, the control circuit 270 may transmit a signal for instructing the change of the supply voltage of the external electronic device 102 by using the identification circuit 233.

Referring to reference numeral 501, the electronic device 200a and the external electronic device 102 may be connected with each other through the first input/output terminal 210. According to an embodiment, the external electronic device 102 may operate in a first operating state (e.g., an OTG mode), when the external electronic device 102 is connected with the electronic device 200a. For example, in the external electronic device 102, a processor 294 may identify the connection with the electronic device 200a using the identification circuit 296 and may control the power management IC 293 to operate in the first operating state. For example, in the first operating state, the power management IC 293 may supply a voltage from the battery 292 to the electronic device 200a by boosting or reducing the voltage using a DC-DC converter 501. For example, the power management IC 293 may apply the voltage of about 5 V to the electronic device 200a.

According to an embodiment, the power from the power management IC 293 may be transmitted to the electronic device 200a through a protective circuit 599 (e.g., overvoltage protection circuit).

For example, the first switch 240 may be in the ON state. According to an embodiment, the control circuit 270 of the electronic device 200a may control the first switch 240 to be in the ON state, based on the connection with the external electronic device 102. In this case, the power supplied from the external electronic device 102 may be transmitted to the power supply module 230 through the first switch 240. For example, the first switch 240 may be a two-way switch (e.g., the direction from the first input/output terminal 210 to the second input/output terminal 220 and the reverse direction thereof).

Referring to reference numeral 505, according to an embodiment, the external electronic device 102 may supply the power from the battery 292 to the electronic device 200a without passing through the DC-DC converter 501. For example, in the external electronic device 102, the processor 294 may identify the connection with the electronic device 200a using the identification circuit 296 and may control the power management IC 293 to be in a second operating state. In the second operating state, the power management IC 293 may directly supply the power from the battery 292 to the electronic device 200a, For example, in the second operating state, the power management IC 293 may supply the voltage from the battery 292 to the electronic device 200a without passing through the DC-DC converter 501. The power loss of the external electronic device 102 may be reduced by reducing the power loss caused by the DC-DC converting. For example, a first supply voltage of the external electronic device 102 in the first operating state may be different from a second supply voltage in the second operating state. According to an embodiment, the external electronic device 102 may change the supply voltage based on the identification information of the electronic device 200a, the state information of the battery (e.g., battery voltage), or at least one combination thereof. For example, the battery voltage of about 4V may be applied to the electronic device 200a.

A path of supplying the voltage from the external electronic device 102 to the electronic device 200a is provided for the illustrative purpose. In the following description, it will be assumed that one of paths of supplying a voltage through reference numeral 501 or reference numeral 505 is used.

Figure 5B:
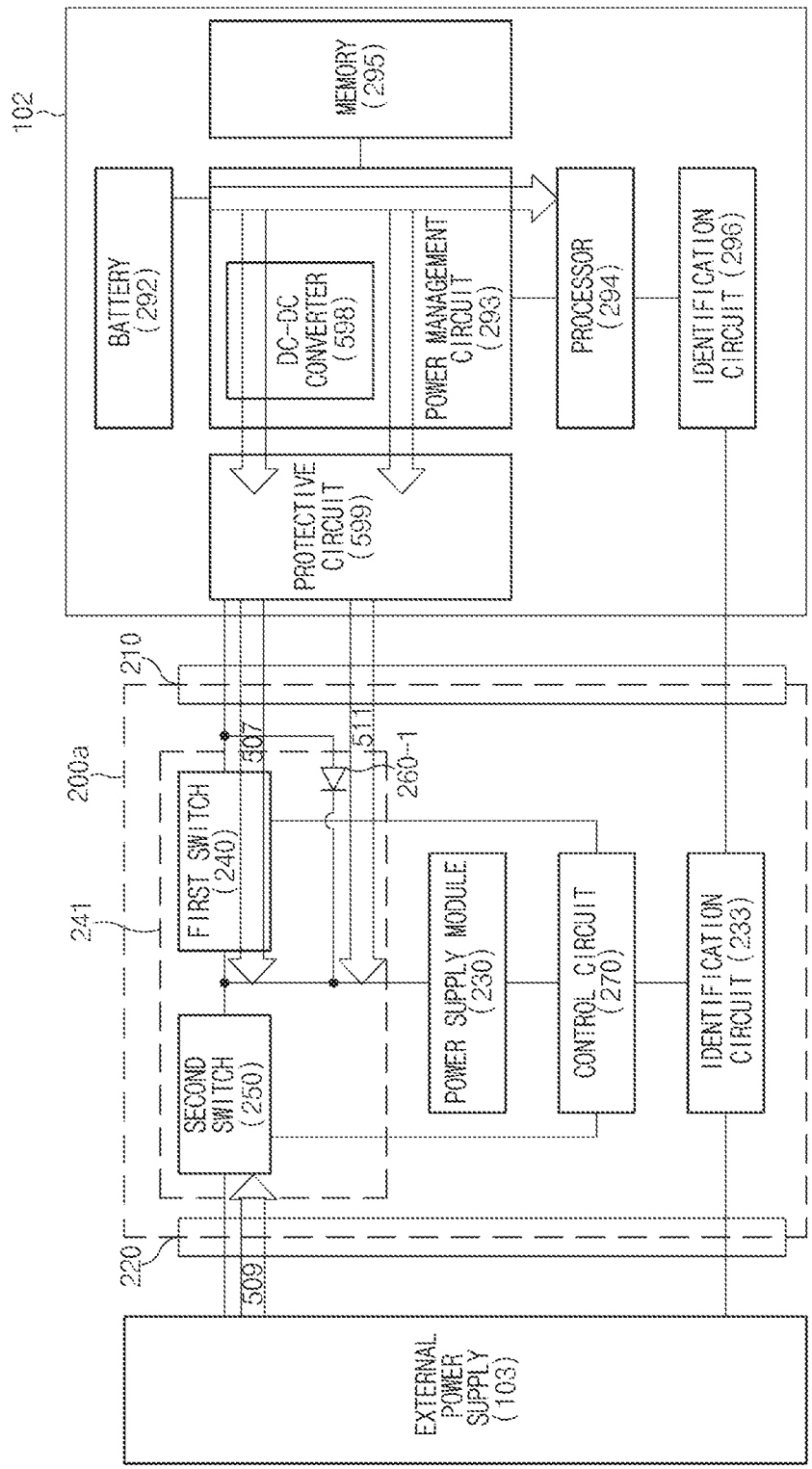
FIG. 5B is a view illustrating a power flow resulting from change in the state of a first switch.

FIG. 5B is a view illustrating the flow of power resulting from a change in the state of a first switch.

Referring to reference numeral 507, the power supplied from the external electronic device 102 may be transmitted to the power supply module 230 through the first switch 240.

In FIG. 5B, the second switch 250 may be assumed as being in the OFF state. In this case, referring to reference numeral 509, the power supplied from the external power supply 103 may be cut off by the second switch 250.

According to an embodiment, the electronic device 200a may change the state of the first switch 240 when sensing the connection with the external power supply 103. For example, the electronic device 200a may sense the connection with the external power supply 103 through the identification circuit 233 and may change the state of the first switch 240 from the ON state to the OFF state.

Referring to reference numeral 511, as the first switch 240 is changed to be in the OFF state, the power supplied from the external electronic device 102 may be transmitted to the power supply module 230 through the first diode 260-1. Accordingly, even if the first switch 240 is in the OFF state, the electronic device 200a may continuously receive power from the external electronic device 102.

Figure 5C:
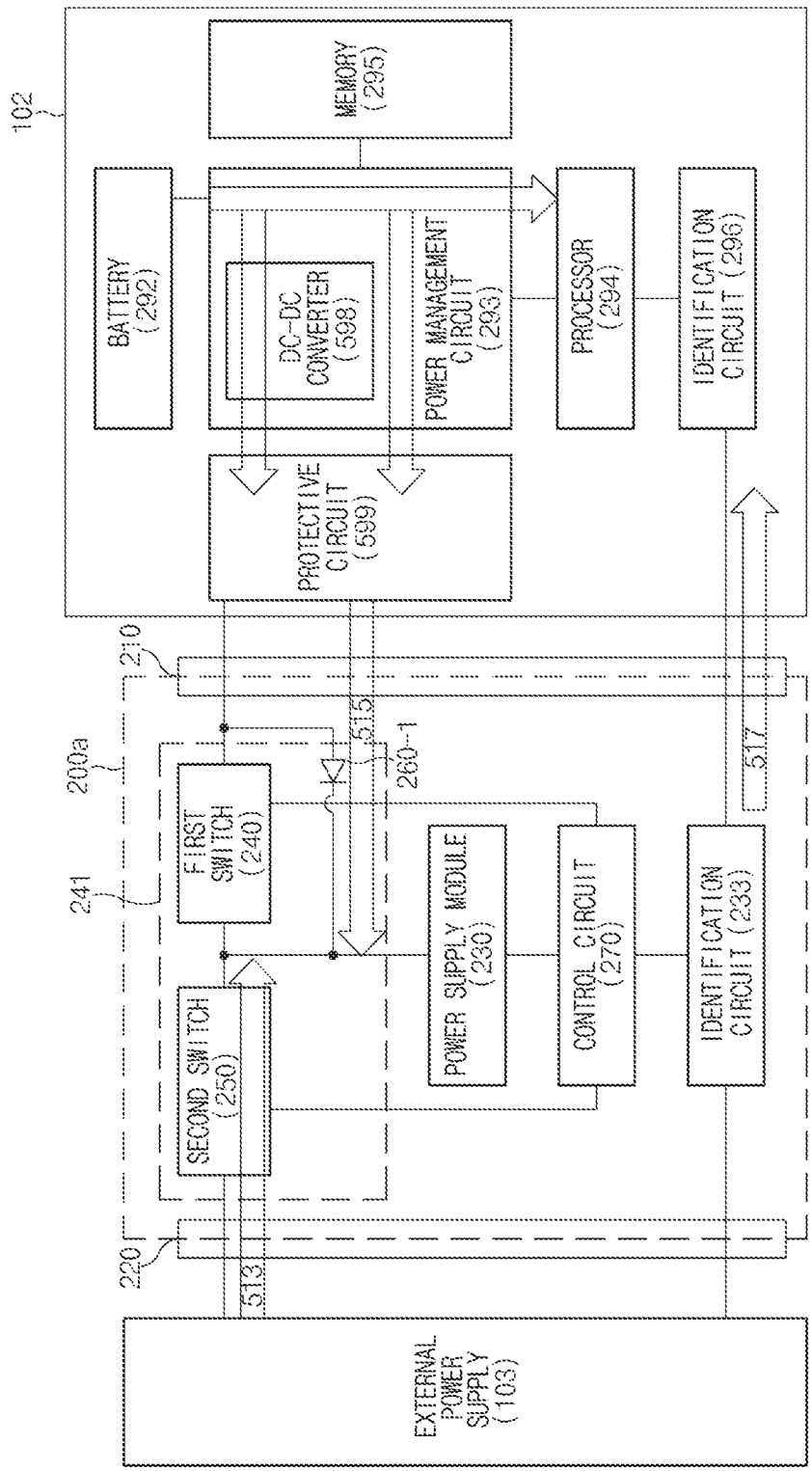
FIG. 5C is a view illustrating a power flow resulting from change in the state of a second switch.

FIG. 5C is a view illustrating the flow of power resulting from a change in the state of the second switch 250.

Referring to FIG. 5C, the electronic device 200a may change the state of the second switch 250 after changing the state of the first switch 240 to be in the OFF state. According to an embodiment, the electronic device 200a may change the second switch 250 to be in the ON state after a specified time from that the first switch 240 is changed to be in the OFF state.

Referring to reference numerals 513 and 515, as the state of the second switch 250 is changed to the OFF state, the power from the external power supply 103 and the external electronic device 102 may be supplied to the power supply module 230. The power supplied from the external power supply 103 may be prevented from being directly supplied to the external electronic device 102, due to the directionality of the first diode 260-1 and the first switch 240 in the OFF state. For example, when the power supplied from the external power supply 103 is supplied to the external electronic device 102 before the operating state of the power management IC 293 is changed, the external electronic device 102 may be damaged.

Referring to reference numeral 517, according to an embodiment, the electronic device 200a may transmit first information to the external electronic device 102. For example, the electronic device 200a may transmit the first information to the external electronic device 102 after the second switch is changed to be the ON state, or substantially simultaneously with that the second switch is changed to be in the ON state. For example, the electronic device 200a may transmit the first information to the external electronic device 102 by using the identification circuit 233. According to an embodiment, the first information may be a signal for instructing the change in the operating state of the external electronic device 102, For example, the first information may be a signal for instructing the change in the operating state of the power management IC 293 of the external electronic device 102. For example, the first information may be a signal having a specified identification value.

Figure 5D:
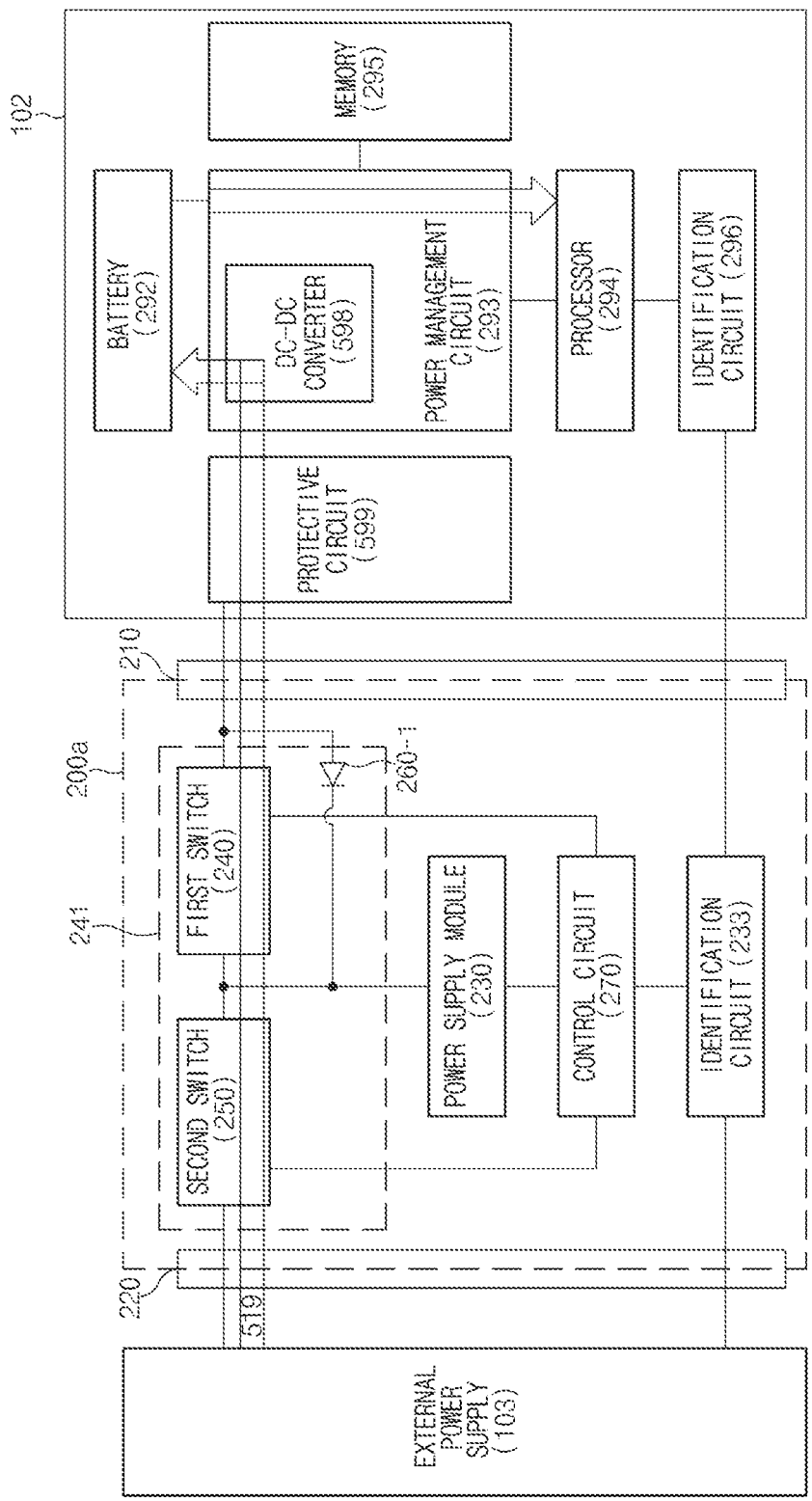
FIG. 5D is a view illustrating the flow of power for charging an external electronic device.

FIG. 5D is a view illustrating the flow of power for charging an external electronic device.

According to an embodiment, the operating state of the external electronic device 102 may be changed in response to receiving the first information. For example, the external electronic device 102 may change the operating state from the first operating state to the second operating state in response to receiving second information. For example, the first operating state may be an OTC mode. For example, the second operating state may be a charging mode. In the charging mode, the power management IC 293 may charge the battery 292 with power received from the electronic device 200a. For example, in the charging mode, the power management IC 293 may charge the battery 292 with at least a portion of the received power, and may supply at least a portion of the power to other components of the external electronic device 102.

Referring to reference numeral 519, power supplied from the external power supply 103 may be supplied to the external electronic device 102 through the electronic device 200a. For example, the electronic device 200a may control the first switch 240 and the second switch 250 to be in an ON state such that the power supplied from the external power supply 103 is transmitted to the external electronic device 102. For example, the external electronic device 102 may supply the received power to the battery 292 by boosting or receiving the received power through a DC-DC converter 598. For example, regarding reference numeral 501 of FIG. 5A, the power supplied from the electronic device 200a may be transmitted to the battery 292 through the same path as the above-described path (the battery 292-DC-DC converter 598-the protective circuit 599) of supplying power.

According to embodiments disclosed herein, the power may be supplied to the peripheral device by smoothly switching from the main device to the external power supply. Accordingly, the abnormal operation of the peripheral device may be prevented during the switching process for the power supply. In addition, the peripheral device, the main device, and the external power supply may be prevented from being damaged, and terminals to connect the devices with each other may be prevented from being damaged. Hereinafter, the exemplary components of the electronic device will be described with reference to FIG. 6.

Figure 6:
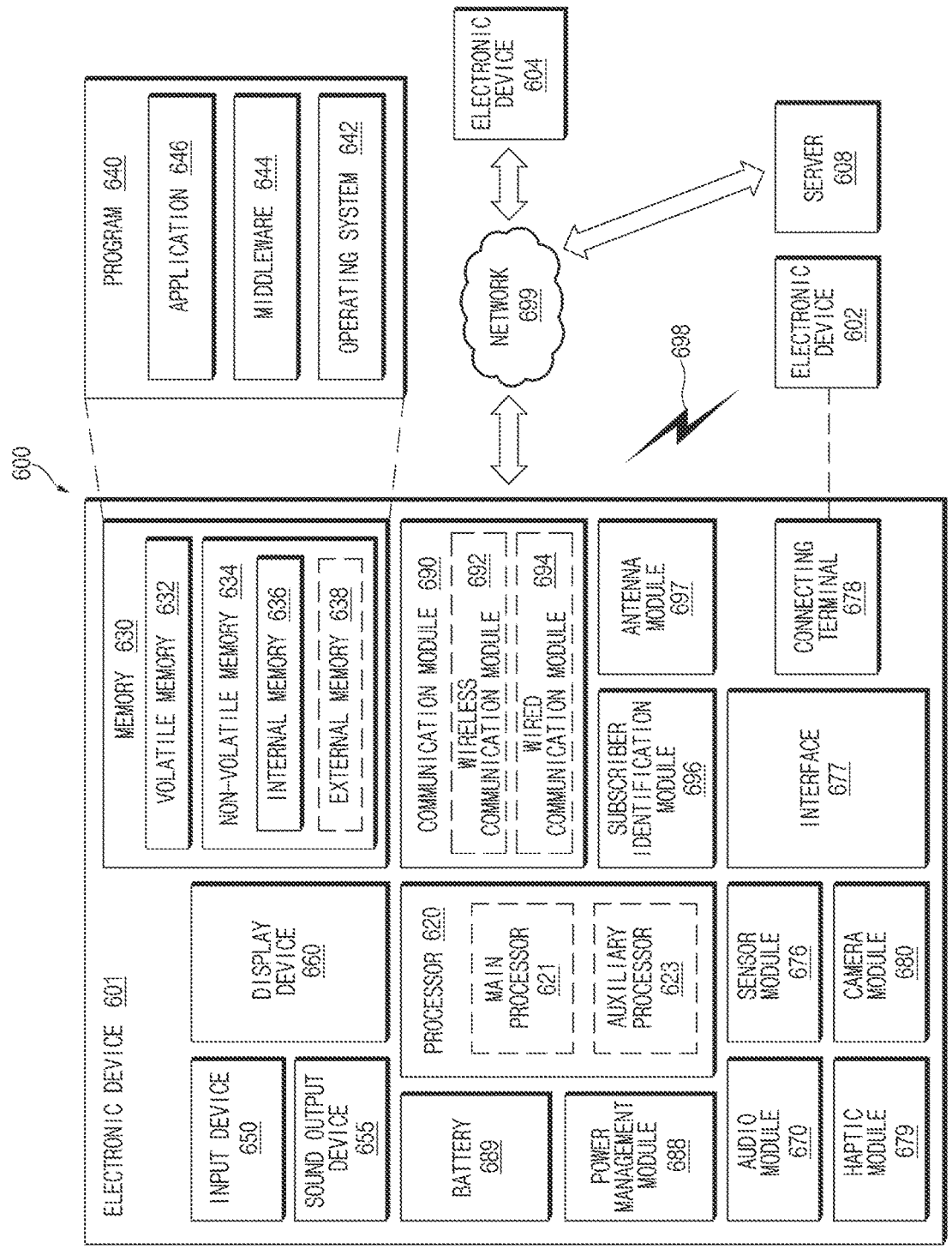
FIG. 6 is a block diagram illustrating an electronic device under a network environment, according to various embodiments.

FIG. 6 is a block diagram illustrating an electronic device 601 in a network environment 600 according to various embodiments. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620, and may perform various data processing or computation. According to one embodiment, as at least part of the data processing or computation, the processor 620 may load a command or data received from another component (e.g., the sensor module 676 or the communication module 690) in volatile memory 632, process the command or the data stored in the volatile memory 632, and store resulting data in nonvolatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, a keyboard, or a digital pen (e.g., a stylus pen).

The sound output device 655 may output sound signals to the outside of the electronic device 601, The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry, to control a corresponding one of the display, hologram device, and projector. According to an embodiment, the display device 660 may include touch circuitry adapted to detect a touch, or sensor circuit (e.g., a pressure sensor) adapted to measure the intensity of force incurred by the touch.

The audio module 670 may convert a sound into an electrical signal and vice versa, According to an embodiment, the audio module 670 may obtain the sound via the input device 650, or output the sound via the sound output device 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device the electronic device 602) directly (e.g., wiredly) or wirelessly. According to an embodiment, the interface 677 may include, for example, a high definition multimedia interface (IMMIX x a universal serial bus (USB) interface, a secure digital (SI)) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GLASS) communication module) or a wired communication module 694 (e.g., a local area network (LAN) communication module or a power line communication (PLC) module), A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to an embodiment, the antenna module 697 may include an antenna including a radiating element composed of a conductive material or a conductive pattern formed in or on a substrate (e.g., PCB). According to an embodiment, the antenna module 697 may include a plurality of antennas. In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699, Each of the electronic devices 602 and 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone, a computer device, a portable multimedia device, a portable medical device, a camera, a wearable device, or a home appliance According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C". "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first input/output terminal;
a second input/output terminal;
a power supply module;
a first switch configured to selectively connect the first input/output terminal with the power supply module;
a second switch configured to selectively connect the second input/output terminal with the power supply module;
a diode connected with the first switch in parallel and including an anode electrically connected with the first input/output terminal and a cathode electrically connected with the power supply module; and
a control circuit configured to control the first switch and the second switch,
wherein the control circuit is configured to:
sense connection with a first external electronic device through the first input/output terminal;
turn on the first switch in response to the sensed connection with the first external electronic device, such that first power is supplied from the first external electronic device to the power supply module,
sense connection with a second external electronic device through the second input/output terminal; and
turn off the first switch in a state that the first power is supplied from the first external electronic device to the power supply module through the diode, in response to the sensed connection with the second electronic device, and turn on the second switch such that second power is supplied to the power supply module from the second external electronic device, in response to the sensed connection with the second external electronic device.

2. The electronic device of claim 1, further comprising:
an identification circuit,
wherein the control circuit is configured to:
transmit second information to the first external electronic device through the first input/output terminal by using the identification circuit, such that an operating mode of the first external electronic device is changed from a power discharging mode to a power charging mode, after controlling the second switch to be turned on.

3. The electronic device of claim 2, wherein the control circuit is configured to:
turn on the first switch such that at least a portion of the second power, which is supplied from the second external electronic device, is transmitted to the first external electronic device, after transmitting the second information.

4. The electronic device of claim 3, wherein the first switch is a two-way switch.

5. The electronic device of claim 1, wherein the diode corresponds to a first diode, and
wherein the electronic device further includes:
a second diode connected with the second switch in parallel, and including an anode electrically connected with the second input/output terminal and a cathode electrically connected with the power supply module.

6. The electronic device of claim 5, wherein the first switch is a one-way switch that is able to be conducted in a direction of the power supply module from the first input/output terminal.

7. The electronic device of claim 1, wherein the second switch is a one-way switch that is able to be conducted in a direction of the power supply module from the second input/output terminal.

8. The electronic device of claim 1, wherein the first input/output terminal and the second input/output terminal includes at least one of a type A, type B, mini-A, mini-B, micro-A, micro-B, USB 3.0 type A, USB 3.0 type B, USB 3.0 micro B, or USB 3.1 type C terminal.

9. The electronic device of claim 1, wherein the power supply module is configured to perform DC-DC converting with respect to the first power or the second power which is supplied.

10. The electronic device of claim 1, further comprising:
an output module,
wherein the control circuit is configured to:
receive specified data from the first external electronic device through the first input/output terminal; and
output specified information based on the received data by using the output module.

11. A method for supplying power to an electronic device; the method comprising:
sensing connection with a first external electronic device through a first input/output terminal;
turning on a first switch, which is connected between the first input/output terminal and a power supply module, in response to the sensed connection with the first external electronic device, such that first power is supplied from the first external electronic device to the power supply module of the electronic device;

sensing connection with second external electronic device through a second input/output terminal different from the first input/output terminal; and turning off the first switch in a state that the first power is supplied from the first external electronic device to the power supply module through a diode which is connected with the first switch in parallel between the first input/output terminal and the power supply module, and turning on a second switch, which is connected between the second input/output terminal and the power supply module, such that second power is supplied to the power supply module from the second external electronic device, in response to the sensed connection with the second external electronic device.

12. The method of claim 11, further comprising:

transmitting a specified signal to the first external electronic device through the first input/output terminal, such that an operating mode of the first external electronic device is changed from a power discharging mode to a power charging mode, before turning on the second switch after turning off the first switch, wherein the first external electronic device is configured to stop supplying the first power through the first input/output terminal, in the power charging mode.

13. The method of claim 12, further comprising:

turning on the first switch such that at least a portion of the second power supplied from the second external electronic device is transmitted to the first external electronic device, after turning on the second switch.

14. The method of claim 11, further comprising:

performing DC-DC converting with respect to the second power which is supplied.

15. The method of claim 11, further comprising:

receiving specified data from the first external electronic device through the first input/output terminal; and outputting specified information based on the received data.

* * * * *